United States Defensive Publication [19] (H) [11] T964,002

Kuchek [43] Nov. 1, 1977

[54] METHOD TO PURIFY MAGNESIUM CHLORIDE TO PRODUCE A FLUX FOR MOLTEN MAGNESIUM

[76] Inventor: Henry A. Kuchek, 4842 S. Garfield Road, Auburn, Mich. 48611

[21] Appl. No.: 738,192

[22] Filed: Nov. 3, 1976

[51] Int. Cl.[2] ..... C22B 45/00

[52] U.S. Cl. ..... 75/67 A; 75/93 AB; 75/257; 423/498

[57] ABSTRACT

A method to remove organic impurities, such as Grignard reagents, from an impure magnesium chloride by heating the magnesium chloride in a vacuum at a temperature of up to about 500° C, and preferably from about 300° to about 500° C, and recovering a purified magnesium chloride product. The purified product is preferably added to a molten bath including potassium chloride and commercially pure magnesium chloride at a temperature of at least about 426° C and preferably from about 450° to about 760° C. The bath is thereafter solidified into a desired size and used as a flux for molten magnesium. Upon solidification, the magnesium treated with flux including the purified magnesium chloride has a finer grain size than magnesium treated with a similar flux containing commercially pure magnesium chloride.

3 Claims, No Sheets Drawing,

7 Pages Specification

The file of this unexamined application may be inspected and copies thereof may be purchased (849 O.G. 1221, Apr. 9, 1968).